(12) United States Patent
Davis et al.

(10) Patent No.: US 6,649,102 B2
(45) Date of Patent: Nov. 18, 2003

(54) METHOD OF CUTTING EXPANDED GRAPHITE SHEET MATERIAL

(75) Inventors: Neil V. Davis, New Westminster (CA); David Brown, Surrey (CA)

(73) Assignee: Ballard Power Systems Inc., Burnaby (CA)

( * ) Notice: Subject to any disclaimer, the term of this patent is extended or adjusted under 35 U.S.C. 154(b) by 323 days.

(21) Appl. No.: 09/772,276

(22) Filed: Jan. 29, 2001

(65) Prior Publication Data

US 2002/0102321 A1 Aug. 1, 2002

(51) Int. Cl.⁷ .................... B29C 59/02; B29C 59/04; B29C 69/00
(52) U.S. Cl. ........................ 264/163; 264/293
(58) Field of Search ................. 264/154, 155, 264/156, 163, 293

(56) References Cited

U.S. PATENT DOCUMENTS

| | | | |
|---|---|---|---|
| 4,676,515 A | 6/1987 | Cobb | |
| 4,705,278 A | 11/1987 | Locacius et al. | |
| 4,752,518 A | * 6/1988 | Lohrke et al. | .......... 264/154 X |
| 4,988,583 A | 1/1991 | Watkins et al. | |
| 5,180,459 A | 1/1993 | Bauer et al. | |
| 5,226,662 A | 7/1993 | Justus | |
| 5,300,370 A | 4/1994 | Washington et al. | |
| 5,527,363 A | 6/1996 | Wilkinson et al. | |
| 5,795,518 A | 8/1998 | Parr | |
| 5,885,728 A | 3/1999 | Mercuri et al. | |
| 6,092,811 A | 7/2000 | Bojarczuk et al. | |

OTHER PUBLICATIONS

Abstract of DE 3309338 (Sep. 27, 1984).
Abstract of DE 4128308 (Mar. 4, 1993).

* cited by examiner

*Primary Examiner*—Leo B. Tentoni
(74) *Attorney, Agent, or Firm*—McAndrews, Held & Malloy, Ltd.

(57) ABSTRACT

In a method and apparatus for cutting expanded graphite sheet material, at least one cutting tool is urged against the sheet(s). The cutting tool has at least one ridge extending therefrom, that includes a substantially tapered cross-section having sloping sides and an edge surface. At least a portion of the sheet material is displaced as the ridge is urged against the sheet. A region of the sheet material in contact with the ridge is compressed so that the density of the region reaches or exceeds the breaking density of the sheet.

18 Claims, 2 Drawing Sheets

A      B

METHOD OF CUTTING EXPANDED GRAPHITE SHEET MATERIAL

FIELD OF THE INVENTION

The present invention relates to methods and apparatus for cutting expanded graphite sheet.

BACKGROUND OF THE INVENTION

Electrochemical fuel cells convert reactants, namely fuel and oxidants, to generate electric power and reaction products. Electrochemical fuel cells generally employ an electrolyte disposed between two electrodes, namely a cathode and an anode. The electrodes both comprise an electrocatalyst disposed at the interface between the electrolyte and the electrodes to induce the desired electrochemical reactions. The fuel fluid stream which is supplied to the anode may be a gas such as, for example, substantially pure hydrogen or a reformate stream comprising hydrogen. Alternatively, a liquid fuel stream such as, for example, aqueous methanol may be used. The oxidant fluid stream, which is supplied to the cathode, typically comprises oxygen, such as substantially pure oxygen, or a dilute oxygen stream such as air.

Solid polymer fuel cells employ a solid polymer electrolyte, otherwise referred to as an ion exchange membrane. The membrane is typically interposed between two electrode layers, forming a membrane electrode assembly ("MEA"). While the membrane is typically selectively proton conductive, it also acts as a barrier, isolating the fuel and oxidant streams from each other on opposite sides of the MEA. The MEA is typically disposed between two plates to form a fuel cell assembly. The plates act as current collectors and provide support for the adjacent electrodes. The assembly is typically compressed to ensure good electrical contact between the plates and the electrodes, and to ensure adequate sealing between fuel cell components. A plurality of fuel cell assemblies may be combined in series or in parallel to form a fuel cell stack. In a fuel cell stack, a plate may be shared between two adjacent fuel cell assemblies, in which case the plate also serves as a separator to fluidly isolate the fluid streams of the two adjacent fuel cell assemblies.

Fuel cell plates known as fluid flow field plates have open-faced channels formed in one or both opposing major surfaces for directing reactants and/or coolant fluids to specific portions of such major surfaces. The open-faced channels also provide passages for the removal of reaction products, depleted reactant streams, and/or heated coolant streams. For an illustration of a fluid flow field plate, see, for example, U.S. Pat. No. 4,988,583, issued Jan. 29, 1991. Where the major surface of a fluid flow field plate faces an MEA, the open-faced channels typically direct a reactant across substantially all of the electrochemically active area of the adjacent MEA. Where the major surface of a fluid flow field plate faces another fluid flow field plate, the channels formed by their cooperating surfaces may be used for carrying coolant for controlling the temperature of the fuel cell.

Fluid flow field plates may also have apertures therein. For example, fluid flow field plates may have manifold openings for supplying and exhausting reactants and/or coolant to and from the channels. When assembled in a fuel cell stack, such manifold openings in the plates of adjacent fuel cells cooperate to form the manifolds for supplying and exhausting reactants and/or coolant to and from the stack.

Conventional methods of fabricating fluid flow field plates require the engraving or milling of flow channels (and optionally apertures) into the surface of rigid plates formed of graphitized carbon-resin composites. These methods of fabrication place significant restrictions on the minimum achievable cell thickness due to the machining process, plate permeability, and required mechanical properties. Further, such plates are expensive, both in raw material costs and in machining costs. The machining of channels and the like into the graphite plate surfaces causes significant tool wear and requires significant processing times.

Alternatively, fluid flow field plates can be made by a lamination process, as described in U.S. Pat. No. 5,300,370, issued Apr. 5, 1994, in which an electrically conductive, fluid impermeable separator layer and an electrically conductive stencil layer are consolidated to form at least one open-faced channel. Such laminated fluid flow field assemblies tend to have higher manufacturing costs than single-layer plates, due to the number of manufacturing steps associated with forming and consolidating the separate layers.

Alternatively, fluid flow field plates can be made from an electrically conductive, substantially fluid impermeable material that is sufficiently compressible or moldable so as to permit embossing. Expanded graphite sheet is generally suitable for this purpose because it is relatively impervious to typical fuel cell reactants and coolants and thus is capable of fluidly isolating the fuel, oxidant, and coolant fluid streams from each other; it is also compressible and embossing processes may be used to form channels in one or both major surfaces. For example, U.S. Pat. No. 5,527,363, issued Jun. 18, 1996, describes fluid flow field plates comprising a metal foil or sheet interposed between two expanded graphite sheets having flow channels embossed on a major surface thereof.

However, forming apertures in expanded graphite sheet can be problematic, especially in the context of high-volume manufacturing. Expanded graphite sheet is formed from expanded graphite particles compressed into thin sheets. The sheet comprises aligned expanded graphite particles and constituent layers of carbon atoms parallel to the surface of the sheet. A conventional approach to making apertures in the sheets involves punch cutting the apertures, in which mating male and female punch features shear or tear the expanded graphite sheet. Punch cutting may be performed during embossing or in a separate step following embossing. Due to the nature of the material, however, punch cutting typically results in apertures with poor or inconsistent edge quality, material flaking around the edge of the aperture, and material cutout failures. In addition, where punch cutting occurs in a separate step following embossing, inconsistently placed apertures can also be a problem.

It would be desirable to have a method and apparatus for forming apertures in expanded graphite sheet flow field plates having improved edge characteristics, in an efficient and repeatable manner.

SUMMARY OF THE INVENTION

In one embodiment, the present method for cutting an expanded graphite sheet comprises:
  (a) urging at least one cutting tool against the sheet, the cutting tool having at least one ridge extending therefrom, the ridge comprising a substantially tapered cross-section having sloping sides and an edge surface;
  (b) displacing at least a portion of the material comprising the sheet as the ridge is urged against the sheet; and
  (c) compressing a region of the sheet in contact with the at least one ridge so that the density of the region at least reaches the breaking density of the sheet.

The expanded graphite sheet may comprise at least one embossed fluid flow field plate. In another embodiment, the present method may further comprise embossing the expanded graphite sheet to form at least one fluid flow field plate.

The ridge(s) may define the perimeter of an aperture. The ridge(s) may comprise a plurality of ridges, each of the ridges defining the perimeter of an aperture.

In the present method, the density of the compressed region of the sheet may reach at least 2.2 g/cm$^3$.

In the present method, the cutting tool(s) may be a die, such as a reciprocal die or a roller die, for example.

In a further embodiment of the present method, step (a) may further comprise urging a pair of cutting tools against opposing major surfaces of the sheet, wherein each of the cutting tools has at least one ridge extending therefrom, with the ridges opposing one another. Step (c) may further comprise compressing a region of the sheet interposed between the opposing ridges so that the density of the region at least reaches the breaking density of the sheet.

Where the cutting tool is a die, it may have embossing features incorporated therein. Where opposing cutting tools are employed in the present method, each of the dies may comprise a plurality of ridges, and each pair of opposing ridges may define the perimeter of an aperture. The opposing ridges may approach each other without making contact as the pair of cutting tools are urged towards each other. Again, the dies may be reciprocal dies or roller dies, if desired.

One embodiment of the present apparatus for cutting an expanded graphite sheet comprises:

(a) at least one die adapted to be urged against the sheet, the die(s) having at least one cutting ridge extending therefrom, the ridge(s) comprising a substantially tapered cross-section having sloping sides and an edge surface; and (b) at least one compression mechanism adapted to urge the die(s) against the sheet.

In another embodiment, the present apparatus further comprises a pair of dies adapted to receive the sheet therebetween, each of the dies having at least one cutting ridge extending therefrom, wherein the ridges on respective dies oppose one another, and the compression mechanism is adapted to urge the dies against the sheet.

In the present apparatus, a ridge on a die may define the perimeter of an aperture. For example, where the present apparatus comprises opposing dies, each of the dies may comprise a plurality of cutting ridges, wherein each pair of opposing ridges defines the perimeter of an aperture.

In the present apparatus, at least one die may have embossing features incorporated therein for forming at least one fluid flow field plate from the sheet.

Where the dies comprise reciprocal dies, the compression mechanism may comprise a press platen. Where the present apparatus comprises a pair of opposing roller dies, the roller dies are capable of forming a nip therebetween that is less than the thickness of the sheet, and the compression mechanism may comprise feeding the sheet between the roller dies.

In the present apparatus, the width of the edge surface of a ridge may be less than or equal to about 300 μm. The sloping sides of a ridge may be chamfered or radiused.

BRIEF DESCRIPTION OF THE DRAWINGS

FIG. 1b is a cross-sectional view of a portion of plate 10 through the line B—B illustrated in FIG. 1a.

DETAILED DESCRIPTION OF PREFERRED EMBODIMENT(S)

Figure 1A:
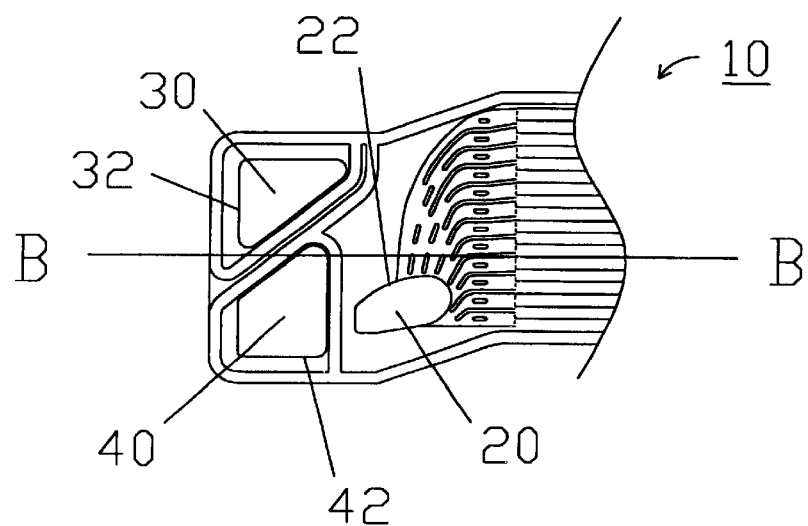
FIG. 1a is a plan view of a portion of a fluid flow field plate made according to the present method.

As used in this description and in the appended claims, "expanded graphite sheet material" means sheet materials comprising expanded graphite, including composites thereof such as, for example, the composite described in U.S. Pat. No. 5,885,728, issued Mar. 23, 1999. "Expanded graphite sheet material" also includes laminates that include one or more layers comprising expanded graphite.

The present method and apparatus pinch-cuts expanded graphite sheet by urging at least one cutting tool having a ridge extending therefrom against the sheet. The ridge comprises a substantially tapered cross-section having sloping sides and a substantially flattened edge surface. As the ridge is urged against the sheet, it contacts and displaces at least a portion of the material comprising the sheet. The present method and apparatus may be used to displace all of the material comprising the sheet as the ridge is urged against it in order to make the pinch-cut.

Optionally, the ridge may also compress a region of the sheet in contact with the edge surface so that the density of the region at least reaches the breaking density of the sheet. As described herein, the breaking density of an expanded graphite sheet is the density at which the sheet fractures. For expanded graphite sheet consisting essentially of expanded graphite particles, such as material available from Graftech Inc. (Danbury, Conn., USA) under the trade designation "GRAFOIL", the breaking density is about 2.2 g/cm$^3$. The breaking density of a particular expanded graphite sheet may easily be determined empirically by compressing a region of the sheet until satisfactory fracturing of the sheet is achieved.

In an embodiment of the present method a single cutting tool is urged against the expanded graphite sheet to pinch-cut it. The cutting tool may comprise a die having at least one ridge extending therefrom, for example. If desired, the ridge may define the perimeter of the aperture to be formed. The ridge is urged against the expanded graphite sheet and displaces at least a portion of the material comprising the sheet. At least the portion of the expanded graphite sheet in contact with the ridge is preferably supported on a substantially flat surface. The ridge of the cutting tool may be urged against the sheet so that substantially all of the material comprising the sheet in contact with the ridge is displaced, that is, until the edge surface of the ridge contacts the support, thereby pinch-cutting the sheet. Alternatively, the ridge of the cutting tool may be urged against the expanded graphite sheet without contacting the underlying support, and the edge surface of the ridge may compress a region of the sheet in contact with the ridge so that the density of the region at least reaches the breaking density of the sheet. As the region of the sheet reaches the breaking density, it will form a controllable fractured surface that will complete the pinch-cut.

The die may be a reciprocal die or a roller die, for example. The die or other cutting tool may comprise a plurality of ridges and each ridge may define the perimeter of an aperture, if desired. Other suitable cutting tool arrangements will be apparent to persons skilled in the art.

The expanded graphite sheet may comprise at least one embossed fluid flow field plate and the foregoing embodiment may be employed to form apertures in the plate(s).

The foregoing embodiment may also further comprise embossing the expanded graphite sheet to form at least one fluid flow field plate. For example, the cutting tool may comprise a reciprocal die having embossing features therein for forming at least one fluid flow field plate. The expanded graphite sheet may be placed between the cutting die and a blank, for example, if a fluid flow field plate having flow channels formed on one side thereof is desired. Alternatively, another die having embossing features therein may be used if it is desired to produce a fluid flow field plate having flow channels formed on both sides thereof. Similarly, the cutting tool may comprise a roller cutting die having embossing features therein, and the expanded graphite sheet may be directed to the nip between the cutting roller die and a featureless roller or another roller die, as desired. Where a second embossing die is employed, it may have a substantially flat surface opposing the ridge of the cutting die to assist in compressing the region of the sheet in contact with the ridge to a more uniform density.

Another embodiment of the present method is substantially as described above, except that the expanded graphite sheet is compressed between a pair of cutting tools having at least one ridge extending therefrom so that the respective ridges oppose each other. As the opposing ridges are urged towards each other, each displaces a portion of the material comprising the expanded graphite sheet. The opposing ridges may be made to contact each other, thereby making the pinch-cut. Alternatively, the opposing ridges can approach each other without making contact, and the edge surfaces of each ridge may compress a region of the sheet interposed between them such that the density of the region at least reaches the breaking density of the sheet. As the region of the sheet reaches the breaking density, it will form a controllable fractured surface that will complete the pinch-cut.

The pair of cutting tools may comprise a pair of dies and the expanded graphite sheet could be compressed between them. The dies may comprise reciprocal dies or roller dies, for example.

The expanded graphite sheet may comprise at least one embossed fluid flow field plate and the foregoing embodiment may be employed to form apertures in the plate(s). Alternatively, one or both of the dies may further comprise embossing features therein for forming at least one fluid flow field plate, and the embodiment of the present method may further comprise embossing the expanded graphite sheet to form at least one fluid flow field plate, as described above.

The present method may be used to form a plurality of apertures in the expanded graphite sheet. For example, the cutting tool(s) may comprise a plurality of ridges which each define the perimeter of an aperture. The apertures may comprise inlet and outlet manifold openings for the supply and discharge of reactants and/or coolant to the fluid flow field plate, for example.

FIG. 1a is a plan view of a portion of a fluid flow field plate made according to the present method. In plate 10, apertures 20, 30, and 40 have perimeter edges 22, 32, and 42, respectively. Aperture 20 is a manifold opening for one of the fuel cell reactants (either fuel or oxidant), and apertures 30, 40 are manifold openings for the other fuel cell reactant and coolant, respectively. The manifold opening apertures of plate 10 are for illustrative purposes only; a fluid flow field plate may comprise other apertures instead of, or in addition to internal manifold openings, as desired.

Figure 1B:
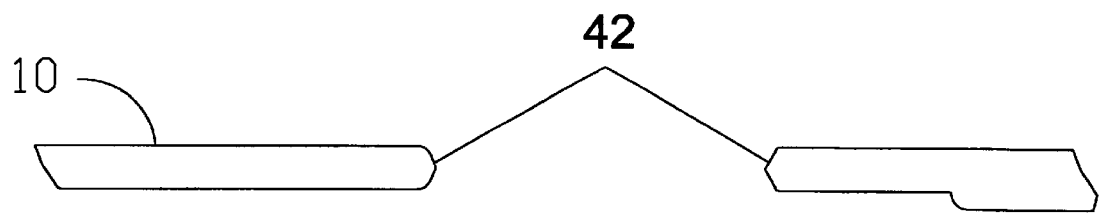

FIG. 1b is a cross-sectional view of a portion of plate 10 through the line B—B illustrated in FIG. 1a. Specifically, FIG. 1b is a cross-sectional view of the portion of plate 10 in the vicinity of aperture 40. Perimeter edge 42 was formed by compressing an expanded graphite sheet between a pair of dies having opposing ridges that approach but do not contact during the pinch-cutting process, as described above. As illustrated in FIG. 1b, the present method may produce a perimeter having a small fractured surface and a generally consistent wedge-shaped edge profile.

Figure 2A:
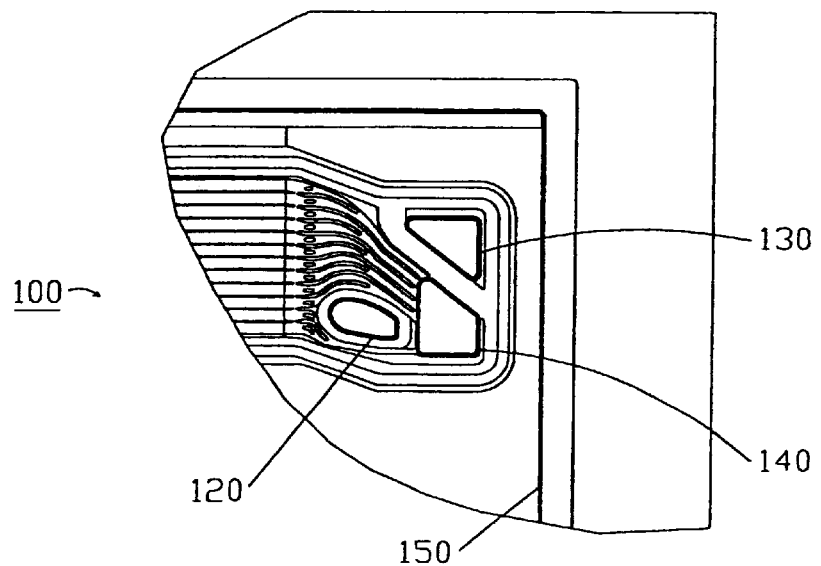
FIG. 2a is a plan view of a portion of an embodiment of the present apparatus.

FIG. 2a is a plan view of a portion of an embodiment of the present apparatus. Die 100 comprises ridges 120, 130, and 140 for forming apertures in an expanded graphite sheet corresponding to apertures 20, 30, and 40, respectively, in plate 10 illustrated in FIG. 1a. Die 100 may also comprise embossing features therein for forming at least one fluid flow field plate, as illustrated. Alternatively, plate 100 may not comprise such embossing features and may be employed to form apertures in embossed fluid flow field plates. Die 100 further comprises ridge 150 that circumscribes the at least one fluid flow field plate and provides a means for cutting the plate(s) from the expanded graphite sheet. Instead of circumscribing plates, ridge 150 may instead extend across the length or width of the sheet and the present method and apparatus may be employed for cutting the sheet. Ridge 150 may be used to cut individual plates or groups of plates from a continuous roll of expanded graphite sheet material, for example.

Figure 2B:
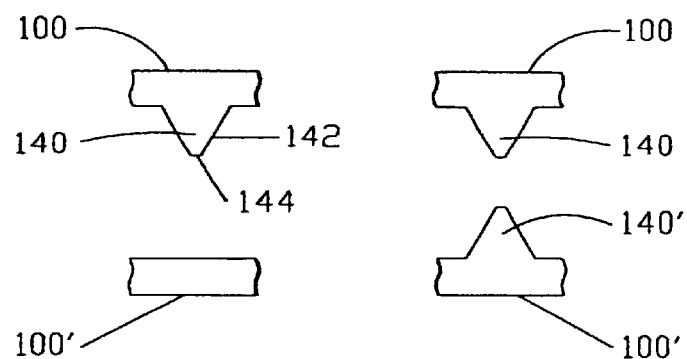
FIG. 2b is a cross-sectional view including a portion of die 100 comprising ridge 140.

FIG. 2b is a cross-sectional view including a portion of die 100 comprising ridge 140. While the following discussion is directed to ridge 140, the same considerations apply to any ridge formed on any cutting tool according to the present apparatus. Ridge 140 comprises a substantially tapered cross-section having sloping sides 142 and an edge surface 144. Sides 142 of ridge 140 may be chamfered, as shown in FIG. 2B, or they may be radiused. Similarly, edge surface 144 may be substantially flat edges, as illustrated, or it may have radiused edges.

The preferable dimensions and cross-sectional shape of ridge 140 depend on such factors as the thickness of the expanded graphite sheet and its composition, as well as the desired edge profile of apertures to be formed. The same considerations apply to the other ridges on die 100. Persons skilled in the art may determine, for a given application, suitable dimensions and cross-sectional shapes for ridges in the present apparatus.

For example, the draft angle of the sides of the ridge should be great enough to displace at least a portion of the material comprising the expanded graphite sheet to be pinch-cut. An insufficient draft angle may result in insufficient displacement and over-compression of the expanded graphite sheet material, and may result in poorly formed edges of cut pieces or hydrostatic locking of the material to the cutting tool. The suitable minimum draft angle of the sides of the ridge is dependent on factors such as the thickness of the expanded graphite sheet. The greater the draft angle, the larger the edge region of the pinch-cut.

A suitable width for the edge surface of the ridge depends on such factors as the size distribution of the expanded graphite particles comprising the expanded graphite sheet. If the width of the edge surface is below a minimum distance, the edge surface will tend to cut the expanded graphite particles instead of displacing them, which is undesirable. If the width of the edge surface is too great, the edge surface will tend to compress to large a region of the expanded graphite material instead of displacing it, which is also undesirable. For expanded graphite sheet material comprising 50–100 mesh particles, for example, the maximum width of the edge surface of the ridge is about 300 $\mu$m.

Die 100 may be used to pinch-cut embossed fluid flow field plates or for pinch-cutting and embossing expanded graphite sheet to form such plates. An example of such an arrangement is illustrated in FIG. 2b by the designation "A", where ridge 140 of die 100 may be urged towards a substantially flat region of die (or blank) 100'. Alternatively, die 100 may be used in conjunction with a complimentary die to form apertures in embossed fluid flow field plates or for forming apertures in and embossing such plates. An example of such an arrangement is illustrated in FIG. 2b by the designation "B", where ridge 140 of die 100 may be urged towards corresponding ridge 140' of die 100'. In either example, die 100, die 100', or both, may have embossing features incorporated therein to form fluid flow field plates.

Die 100 may be associated with a press platen for use in a reciprocal die press. Alternatively, die 100 may be associated with a roller for use in a roller press. A roller die apparatus may be desired for continuous cutting (and optionally embossing) of a fluid flow field plates from a roll of expanded graphite sheet for use in high-volume manufacturing processes, if desired.

As illustrated above, the present method and apparatus may allow formation of cuts in expanded graphite sheet having a relatively small fractured surface and a consistent edge profile. In addition, since the cutting ridge(s) need not contact other features associated with forming the apertures, there may be less tool wear associated with the present method and apparatus, as compared to conventional punch-cutting tools.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications that incorporate those features coming within the scope of the invention.

What is claimed is:

1. A method for cutting an expanded graphite sheet, said method comprising:
   (a) urging at least one cutting tool against said sheet, said cutting tool having at least one ridge extending therefrom, said ridge comprising a substantially tapered cross-section having sloping sides and an edge surface;
   (b) displacing at least a portion of the material comprising said sheet as said ridge is urged against said sheet; and
   (c) compressing a region of said sheet in contact with said at least one ridge so that the density of said region at least reaches the breaking density of said sheet.

2. The method of claim 1 wherein said expanded graphite sheet comprises at least one embossed fluid flow field plate.

3. The method of claim 1, further comprising embossing said expanded graphite sheet to form at least one fluid flow field plate.

4. The method of claim 1 wherein said at least one ridge defines the perimeter of an aperture.

5. The method of claim 1 wherein said at least one ridge comprises a plurality of ridges, each of said ridges defining the perimeter of an aperture.

6. The method of claim 1 wherein said density of said region of said sheet at least reaches 2.2 g/cm$^3$.

7. The method of claim 1 wherein said at least one cutting tool is a die.

8. The method of claim 7 wherein said die is a reciprocal die.

9. The method of claim 7 wherein said die is a roller die.

10. The method of claim 1 wherein step (a) further comprises urging a pair of cutting tools against opposing major surfaces of said sheet, each of said cutting tools having at least one ridge extending therefrom, said ridges opposing one another, and step (c) further comprises compressing a region of said sheet interposed between said ridges so that the density of said region at least reaches the breaking density of said sheet.

11. The method of claim 10 wherein said density of said region of said sheet at least reaches 2.2 g/cm$^3$.

12. The method of claim 10 wherein said expanded graphite sheet comprises at least one embossed fluid flow field plate.

13. The method of claim 10, further comprising embossing said expanded graphite sheet to form at least one fluid flow field plate.

14. The method of claim 13 wherein each of said cutting tools is a die, at least one of said dies having embossing features incorporated therein.

15. The method of claim 14 wherein each of said dies comprises a plurality of ridges, each pair of opposing said ridges defining the perimeter of an aperture.

16. The method of claim 15 wherein said dies are reciprocal dies.

17. The method of claim 15 wherein said dies are roller dies.

18. The method of claim 10 wherein said opposing ridges approach but do not make contact with each other as said pair of cutting tools are urged towards each other.

* * * * *